United States Patent Office 2,949,452
Patented Aug. 16, 1960

2,949,452

PROCESS FOR PREPARING ALKYL HYDROXY-ALKYL CELLULOSE ETHERS AND THE PRODUCT OBTAINED THEREBY

Albert B. Savage, Midland, Mich., assignor to The Dow Chemical Company, Midland, Mich., a corporation of Delaware No Drawing. Filed Apr. 30, 1956, Ser. No. 581,384

8 Claims. (Cl. 260—231)

This invention relates to an improved process for preparing certain cellulose ethers and to the ethers so prepared. More particularly it relates to a process for preparing alkyl hydroxyalkyl celluloses having higher gel points and better aqueous solubility characteristics than has been heretofore possible.

Alkyl cellulose ethers and alkyl hydroxyalkyl cellulose ethers of the water-soluble type have been known for a long time and have found wide acceptance in the pharmaceutical, foods, and other fields. The fabrication of such ethers or their use has usually been from aqueous solution. The principal drawbacks and disadvantages of the prior known materials has been in their poor solubility characteristics and properties in water, and particularly in hot water. Thus, in the preparation of aqueous solutions it has always been necessary to first wet the ether with hot water and to cause dissolution subsequently by chilling the suspension. Even by employing such precautions the solutions were always hazy due to the presence of insoluble solids which had to be removed by centrifuging when the cellulose ether was to be used from aqueous solutions. When such solutions were heated to about 50 to 60° C. they gelled, destroying their useful properties. Additionally, the salt tolerance of such cellulose ethers has been very poor and in the presence of salts the temperature at which gelation occurs is lowered proportionately to the salt concentration.

It has been a peculiar property of the water-soluble alkyl celluloses and alkyl hydroxyalkyl celluloses that, when previously prepared water solutions are heated there is the expected decrease in solution viscosity until the gel temperature is approached, whereupon, also as expected, the viscosity rises sharply, but that on cooling the hot solution or gel from temperatures near or above the gel point the viscosity of the solution follows a curve different from that observed during heating. Thus, the viscosity of solutions of such ethers differs, at any given temperature and concentration, depending on whether the solution is being treated toward or cooled from the gel temperature. For some uses this "viscosity hysteresis" is objectionable. It would be desirable to provide water-soluble alkyl hydroxyalkyl celluloses whose solutions, on heating and cooling, show no sigfinicant hysteresis. Past attempts to overcome some of the above difficulties have consisted of forming various mixed carboxymethyl ethers such as carboxymethyl methyl cellulose. Those mixed carboxymethyl ethers have succeeded in raising the temperature at which gelation occurs and have reduced the hysteresis but have not avoided the difficulty of dissolution or improved solubility.

It is accordingly the principal object of this invention to provide a process for preparing certain cellulose ethers which are easily dissolvable in cold water and which are completely soluble in cold water.

It is another object to provide a new class of cellulose ethers having the above properties.

It is a further object to provide a new class of cellulose ethers having temperatures of gelation which are higher than those of the prior known compounds of similar chemical structure, and whose solutions, on heating and cooling, while agitated, show no significant hysteresis.

The above and related objects are accomplished by means of a process whereby cellulose is contacted with certain amounts of a basic material at a relatively low temperature followed by etherification with an etherifying agent consisting of a combination of an alkyl halide and alkylene oxide in certain proportions. The products made in accordance with the new process may be dissolved in cold water without prior wetting with hot water, are more soluble in water, have higher temperatures of gelation, and exhibit greater tolerance to salts than the prior known materials, and their solutions follow essentially the same viscosity-temperature curves when heated and cooled.

Although any form of cellulose may be employed in the process, it should be apparent that the form used must be capable of substantially uniform penetration and of swelling by the basic material at the concentrations and temperatures employed. Cotton linters being readily available, economical, and easy to handle represent a preferred form of cellulose to be used in the process.

The basic material may be any strong base which is capable of reaction with the cellulosic hydroxyls to form an alkali cellulose. Thus, certain organic amines and alcoholates as well as inorganic bases may be used, although for economic reasons the alkali metal hydroxides, and particularly sodium hydroxide, are to be preferred. Where the basic material is normally a solid it is employed in a solution and with the preferred hydroxides it is most convenient to employ an aqueous solution. It is additionally preferred to employ monofunctional basic materials to avoid the possibility of cross-linking between cellulosic molecules which would complicate the subsequent etherification steps.

In the preparation af alkali cellulose, it is preferred to employ ratios of basic material to cellulose of from about 1.2 to 2.8 moles to 1 mole. When sodium hydroxide is used, this ratio will be from 0.3 to 0.7 parts by weight of sodium hydroxide to each part of cellulose. To achieve such a ratio with the common dipping procedures for preparing alkali celluloses it has been found that an alkali hydroxide concentration of from 30 to 55 percent by weight should be used. The alkali cellulose is prepared by contacting the cellulose with the strong base until the alkali cellulose has the above defined molar ratio of base to cellulose. In prior methods of preparing alkali celluloses it was considered necessary to employ the caustic or other base either in excess or at an elevated temperature to achieve substantially uniform penetration and swelling of base throughout the cellulose and consequently to provide satisfactory solubility of the subsequently etherified product. However, that alkali cellulose after subsequent etherification resulted in a product having the previously discussed disadvantages, such as poor aqueous solubility and a relatively low gelation temperature. When substantially less than 1.2 moles of base are used for each mole of cellulose the products after subsequent etherification have a great amount of insoluble material causing hazy solutions and non-homogeneous articles unless such solids are removed by centrifuging. It has now been found that when the cellulose is contacted by dipping, soaking, or other means with the base in the concentrations and weight ratios mentioned above and at about room temperature the cellulose is substantially uniformly penetrated and slightly swollen and an alkali cellulose having a molar ratio of from 1.2 to 2.8 moles base per mole of cellulose results.

It has now been found that when the above prepared alkali cellulose is etherified by employment in certain proportions of an alkyl halide in combination with a lower alkylene oxide a product having superior solubility and gelation properties results. It is preferred to use methyl chloride and ethyl chloride because of their availability and because the higher alkyl halides are less reactive and produce ethers having less aqueous solubility. The alkylene oxides which may be used are those having from 2 to 4 carbon atoms since the higher oxides react very slowly. Propylene oxide is preferred.

It is preferred to employe the alkyl halide at a molar equivalency to the base used. When substantially less alkyl halide is employed complete etherification of the alkali cellulose does not result and the product requires neutralization to prevent gelling and to improve the solubility. When an amount in excess of the stated quantity is used the gel point of the product is lowered.

The alkylene oxide is preferably employed at oxide to cellulose ratios when the oxide is used with methyl halides of 0.22 or less part of ethylene oxide per part of cellulose, 0.25 or less part of propylene oxide per part of cellulose and at least 0.2 part but not more than 0.5 part of butylene oxide per part of cellulose. When ethyl or higher halides are used the amount of oxide or the ratio of oxide to cellulose will be proportionately increased. When no alkylene oxide is used, the ether exhibits high solids or a great amount of insoluble material. When excess alkylene oxide is employed the ether is difficult to wash with hot water to purify the product, since the product gels and is lost in the subsequent isolation steps. Thus, the maximum amount of oxide to be used is less than the limiting amount that causes gelation during washing. The amount of oxide employed will depend to some extent on the viscosity of the ether desired. For high viscosity ethers it is most satisfactory to use from 0.16 to 0.22 part ethylene oxide per part of cellulose while for low viscosity ethers it is desirable to use from 0.1 to 0.15 part ethylene oxide per part of cellulose. The other oxides are used proportionately.

The decrease in insoluble solids exhibited by the products of this invention is greater than is caused by an equivalent increase in methoxyl content. It is believed that the alkylene oxide reacts more readily than the alkyl chloride in the less penetrated regions of the alkali cellulose, or else it aids reaction in these regions.

The etherification is carried out under pressure at a temperature of from 20° C. to 140° C. Although very high temperatures may be used, no beneficial result is attained by using such temperatures and the reaction may be violent and uncontrollable. When the temperature is too low, the reaction is unduly prolonged. Since the reactivity of the reagents varies it should be apparent that the reagents varies it should be apparent that the temperature employed will depend on that reactivity. Thus, when ethylene oxide is employed a considerably lower temperature will be used than when the less reactive butylene oxide is used. Also with the more reactive reagents such as ethylene oxide it is desirable to employ a relatively low temperature at the start of the reaction and to gradually raise the temperature as the reactive reagent is consumed. In this manner the violent polymerization reactions of ethylene oxide are avoided. The optimum temperature to be employed to provide an easily controllable reaction may be determined by simple preliminary experiments. The pressures which are used will be controlled by the reagents and by the temperature employed. Although gauge pressures of from 0 to 200 pounds per square inch may be used it is preferred to operate at 100 pounds per square inch or less.

The alkyl chloride and alkylene oxide may be introduced into the reaction simultaneously or sequentially. For practical reasons it is preferred to introduce those etherifying reagents simultaneously. The reagents are conveniently brought into contact with the alkali cellulose by evacuating the reaction vessel containing the alkali cellulose and subsequently relieving the vacuum with the etherifying reagents.

The process of this invention produces a product in a yield of 83 to 95 percent of the theoretical yield. The product may be washed with hot water to purify it and yet will dissolve readily in cold water without the necessity of first being wetted with hot water. The ethers so produced have gelation temperatures which are at least 10° C. higher than previously known alkyl hydroxyalkyl cellulose ethers of similar chemical structure and in many cases they do not gel even at 90° C. The aqueous solutions prepared from these ethers are clear and substantially free of insoluble solids. These solutions upon heating and cooling do not exhibit any significant amount of hysteresis as is shown by the prior ethers of similar chemical structure.

The products of the process of this invention find utility in many widespread and diversified applications. Thus, they may be emulsifying agents for polymerization reactions as well as emulsion stabilizers and thickeners for the latexes resulting from such polymerizations. They are granulating agents for other polymerization reactions. They are bulk laxatives. They may be used in or as coatings on foodstuffs and in the hot casting of films and sheets of cellulose ethers. They are useful in wall paper paste, paint removers, and drilling muds.

The operation of the process and the advantages of the products of this invention will be more apparent from the following illustrative examples wherein all parts, percentages, and ratios are by weight.

"Fifteen second" cotton linters pulp was dipped in an aqueous sodium hydroxide solution at various temperatures and at varying ratios of hydroxide to cellulose. Each resulting alkali cellulose was then broken up, loaded into a pressure reactor and the latter was evacuated. The

*Table I*

| Example | 1 | 2 | 3 | 4 | 5 | 6 (for comparison) |
|---|---|---|---|---|---|---|
| Conc. of NaOH in aq. soln | 46.5 | 30 | 48.2 | 47.5 | 48.4 | 48.4 |
| NaOH/1 part cellulose | 0.47 | 0.79 | 0.51 | 0.45 | 0.48 | 0.49 |
| Dipping Temp. (°C.) | 28 | 17 | 28 | 28 | 31 | 32 |
| Oxide | Propylene | Propylene | Ethylene | Butylene | Propylene | None |
| Oxide/1 part cellulose loaded | 0.20 | 0.12 | 0.12 | 0.2 | 1.00 | |
| Alkyl chloride | Methyl | Methyl | Methyl | Methyl | Ethyl | Methyl |
| Alkyl chloride/cellulose loaded | 0.60 | 1.20 | 0.65 | 0.60 | 0.75 | 0.65 |
| Alkyl chloride/1 part cellulose consumed | 0.57 | 1.00 | 0.62 | 0.56 | 0.59 | 0.60 |
| Temps. of etherification (°C.) | (¹) | 2 hrs. 42<br>2 hrs. 53<br>3 hrs. 53–75 | 1 hr. 35<br>2 hrs. 42<br>3 hrs. 68–75 | 2 hrs. 42<br>3.5 hrs. 50–80 | 3 hrs. 35<br>2 hrs. 110 | 2 hrs. 42<br>3 hrs. 52–75 |
| Pressure (Max./final) | 110/24 | 150/98 | 112/20 | 140/150 | 55/40 | 142/45 |
| Viscosity (2% in HOH at 20° C.) | 1,184 | 2,070 | 1,195 | 1,116 | 140 | 802 |
| Gel point (° C.) | 100+ | 82 | 100+ | 73 | None | 62 |
| Alkoxyl (percent) | 20.3 | 24.5 | 23.7 | 22 | 30.3 | 22.9 |
| Total D.S. | 1.48 | 1.45 | 1.40 | 1.30 | 1.34 | 1.36 |
| Yield (Percent) | 90 | 89 | 66 | 93 | 100 | 93 |
| Solids (Percent) | 0.5 | 0.4 | 0.05 | 1.5 | 0.10 | 3 |

¹ 2 hrs. at 42–48° C., 3 hrs. at 52–75° C.

identified alkylene oxide and alkyl chloride were loaded into the reactor and the reaction continued at temperatures below 100° C. until determined amounts of alkyl chloride had reacted. The products were washed with hot water, and dried in an air oven. The results are listed in Table I. The solids were determined by centrifuging a 1 percent aqueous solution and observing the volume of insoluble material.

Example 6 was included for comparative purposes and shows that the absence of the alkylene oxide produces a product having both a low gel point and high insoluble solids. The remainder of the examples show that the products of this invention have low insoluble solids and/or high gel points. It is well known the commercially available grades of methyl hydroxypropyl cellulose have gel points of no higher than 70° C. Thus the products of this invention exhibit gelation at temperatures of at least 10° C. higher than the corresponding ethers prepared by known processes.

EXAMPLE 7

Standard aqueous solutions were prepared from the ethers of this invention and of ethers prepared by prior known processes. The solutions were heated and then cooled and during the heating and cooling were evaluated by a continuously recording torsional viscosimeter with agitation known as a "Brabender Amylograph." The measurement are listed in Table II.

*Table II*

| Sample | Conc. | Temp. | Relative Viscosity | |
|---|---|---|---|---|
| | | | heating | cooling |
| Methyl Cellulose made by prior methods (for comparison) | 0.8 | 25 | 150 | |
| | | 30 | 95 | 65 |
| | | 40 | 50 | 75 |
| | | 50 | 40 | 90 |
| | | 60 | 65 | 120 |
| Methyl Hydroxypropyl cellulose prepared according to Example I | 1.5 | 25 | 140 | |
| | | 30 | 120 | 110 |
| | | 40 | 80 | 80 |
| | | 50 | 55 | 60 |
| | | 60 | 45 | 45 |
| | | 70 | 30 | 30 |
| | | 80 | 25 | 25 |
| | | 90 | 10 | |
| Methyl hydroxypropyl cellulose prepared by prior methods (for comparison) | 0.7 | 25 | 45 | 40 |
| | | 30 | 41 | 40 |
| | | 40 | 35 | 38 |
| | | 50 | 30 | 40 |
| | | 60 | 27 | 40 |
| | | 70 | 38 | 40 |

From the above tables the amount of hysteresis in the methyl cellulose prepared by the prior methods can be seen to be significant whereas with the ether of this invention the hysteresis is negligible.

I claim:

1. The process of preparing alkyl hydroxyalkyl ethers of cellulose which are readily soluble in water, have higher gelation temperatures than the prior known ethers having the same substituents, and the temperature-viscosity curves of whose solutions are essentially free from hysteresis on heating and cooling, which consists essentially in causing cellulose to absorb from about 1.2 to about 2.8 mols of aqueous alkali metal hydroxide per mol. of cellulose, at a temperature from about 15° to about 30° C., and subjecting the resulting alkali cellulose at a temperature from 20° to 140° C. to the etherifying action of an alkyl halide having from 1 to 2 carbon atoms, an amount approximately equivalent to the amount of said absorbed alkali metal hydroxide, and to the etherifying action of an alkylene oxide having from 2 to 4 carbon atoms, until substantially all of the alkyl halide and from about 0.1 to about 0.5 part by weight of alkylene oxide per part of cellulose has reacted, and recovering the resulting mixed ether of cellulose.

2. The process claimed in claim 1 wherein said alkene oxide and said alkyl chloride are brought into simultaneous contact with said alkali cellulose.

3. The proces claimed in claim 1 wherein said alkali metal hydroxide is aqueous sodium hydroxide.

4. The process claimed in claim 1 wherein said alkylene oxide is propylene oxide at an oxide to cellulose ratio of less than 0.25 to 1.

5. The process claimed in claim 1 wherein said alkene oxide is ethylene oxide at an oxide to cellulose ratio of less than 0.22 to 1.

6. The process claimed in claim 1 wherein said alkene oxide is butylene oxide at an oxide to cellulose ratio of at least 0.2 to 1.

7. The proces claimed in claim 1 wherein said alkyl halide is methyl chloride.

8. The process claimed in claim 1 wherein said alkyl halide is ethyl chloride.

References Cited in the file of this patent

UNITED STATES PATENTS

| | | |
|---|---|---|
| 2,265,913 | Lilienfeld | Dec. 9, 1941 |
| 2,619,483 | Wilcox et al. | Nov. 25, 1952 |
| 2,629,667 | Kaveler | Feb. 24, 1953 |
| 2,644,818 | Downing et al. | July 7, 1953 |

OTHER REFERENCES

Cellulose and Cellulose Derivaties, 2nd ed. (Ott et al.), Interscience Publishers, Inc., New York (1954), pp. 888, 895 and 937 relied on.